United States Patent
Chu et al.

(10) Patent No.: US 11,676,265 B2
(45) Date of Patent: Jun. 13, 2023

(54) METHOD AND IMAGE PROCESSING DEVICE FOR MURA DETECTION ON DISPLAY

(71) Applicant: Novatek Microelectronics Corp., Hsinchu (TW)

(72) Inventors: Chih-Yu Chu, Kaohsiung (TW); Po-Yuan Hsieh, Hsinchu (TW); Chieh-En Lee, Taipei (TW); Chung-Hao Tien, New Taipei (TW); Shih-Hsuan Chen, Hsinchu (TW)

(73) Assignee: Novatek Microelectronics Corp., Hsinchu (TW)

(*) Notice: Subject to any disclaimer, the term of this patent is extended or adjusted under 35 U.S.C. 154(b) by 208 days.

(21) Appl. No.: 16/944,165

(22) Filed: Jul. 31, 2020

(65) Prior Publication Data

US 2022/0036527 A1 Feb. 3, 2022

(51) Int. Cl.
*G06T 5/20* (2006.01)
*G06T 7/00* (2017.01)
*G06T 7/11* (2017.01)
*G06V 10/25* (2022.01)
*G06F 18/22* (2023.01)

(52) U.S. Cl.
CPC .............. *G06T 7/001* (2013.01); *G06F 18/22* (2023.01); *G06T 5/20* (2013.01); *G06T 7/11* (2017.01); *G06T 2207/30168* (2013.01); *G06V 10/25* (2022.01)

(58) Field of Classification Search
CPC ......... G06K 9/6215; G06T 5/20; G06T 7/001; G06T 7/11; G06T 2207/30168; G06V 10/25
See application file for complete search history.

(56) References Cited

U.S. PATENT DOCUMENTS

| 6,154,561 | A  | * | 11/2000 | Pratt | G06T 7/001 |
|||||| 348/125 |
| 2003/0109800 | A1 | * | 6/2003 | Polat | A61B 3/032 |
|||||| 600/558 |
| 2006/0158703 | A1 | * | 7/2006 | Kisilev | G06T 7/001 |
|||||| 358/504 |

(Continued)

FOREIGN PATENT DOCUMENTS

| EP | 2095759 A1 | * | 9/2009 | ........... A61B 3/0091 |
| EP | 3329837 A1 | * | 6/2018 | |

OTHER PUBLICATIONS

Oh et al. ("The Defect Detection Using Human Visual System and Wavelet Transform in TFT-LCD Image," Frontiers in the Convergence of Bioscience and Information Technologies; Date of Conference: Oct. 11-13, 2007) (Year: 2007).*

(Continued)

*Primary Examiner* — Yubin Hung
(74) *Attorney, Agent, or Firm* — JCIPRNET

(57) ABSTRACT

A method and an image processing device for mura detection on a display are proposed. The method includes the following steps. An original image of the display is received and segmented into region of interest (ROI) patches. A predetermined range of spatial frequency components are filtered out from the ROI patches to generate filtered ROI patches. A mura defect is identified from the display according to the filtered ROI patches and predetermined mura patterns.

18 Claims, 6 Drawing Sheets

(56) References Cited

U.S. PATENT DOCUMENTS

| | | | | |
|---|---|---|---|---|
| 2008/0036703 | A1* | 2/2008 | Wang | G09G 3/006 345/76 |
| 2014/0169451 | A1* | 6/2014 | Cohen | H04N 19/154 375/240.03 |
| 2019/0362481 | A1* | 11/2019 | Moertelmaier | G06T 7/001 |
| 2020/0251063 | A1* | 8/2020 | Liu | G09G 3/36 |

OTHER PUBLICATIONS

Chen et al. ("Automatic TFT-LCD mura defect inspection using discrete cosine transform-based background filtering and 'just noticeable difference' quantification strategies," Measurement Science and Technology, vol. 19, No. 1; 2007) (Year: 2007).*

Yang et al. ("An Accurate Mura Defect Vision Inspection Method Using Outlier-Prejudging-Based Image Background Construction and Region-Gradient-Based Level Set," IEEE Transactions on Automation Science and Engineering (vol. 15, Iss. 4, Oct. 2018) (Year: 2018).*

Kim et al. ("A Novel Quality Assessment Method for Flat Panel Display Defects," Journal of Display Technology, vol. 12, Iss. 5, May 2016) (Year: 2016).*

Shao et al. ("Robust segmentation for automatic detection of mura patterns," IEEE 13th International Symposium on Consumer Electronics, May 25-28, 2009) (Year: 2009).*

Watson et al. ("A standard model for foveal detection of spatial contrast," Journal of Vision, No. 5, Oct. 2005) (Year: 2005).*

Uttwani et al. ("Detection of Physical Defects in Full Color Passive-Matrix OLED Display by Image Driving Techniques," J. Display Technology, 8(3):154-161 (2012)) (Year: 2012).*

Zhi-Yu Zhu, et al., "Automatic Organic Light-emitting Diode Display Mura Detection Model based on Human Visual Perception and Multi-resolution " SPIE Future Sensing Technologies, Nov. 12, 2019, pp. 1-2.

* cited by examiner

METHOD AND IMAGE PROCESSING DEVICE FOR MURA DETECTION ON DISPLAY

TECHNICAL FIELD

The disclosure relates to a technique for mura detection on a display.

BACKGROUND

"Mura" defects on a display screen are contrast-type defects which appear as non-uniform brightness regions due to manufacture and assembly errors, where one or more pixels are brighter or darker than surrounding pixels. Such defects would impede the performance of the display screen and distract the user from viewing of display contents.

Mura detection on thin-film transistor liquid-crystal diode displays (TFT-LCDs) has been maturely developed. However, the solutions for organic light-emitting diode displays (OLED displays) have not been addressed. Mura on OLED displays normally appear with different shapes and sizes and are extremely difficult to be measured since they are hardly to be distinguished from the background. Moreover, most existing mura detection methods are done through human visual inspection that is subjective, inconsistent, and inefficient, and therefore different types of mura are not able to be properly classified and labelled for demura processes.

SUMMARY OF THE DISCLOSURE

A method and an image processing device for mura detection on a display are proposed.

According to one of the exemplary embodiments, the method includes the following steps. An original image of the display is received and segmented into region of interest (ROI) patches. A predetermined range of spatial frequency components are filtered out from the ROI patches to generate filtered ROI patches. A mura defect is identified from the display according to the filtered ROI patches and predetermined mura patterns.

According to one of the exemplary embodiments, the method includes the following steps. An original image of the display is received and segmented into ROI patches. A predetermined range of spatial frequency components are filtered out from the ROI patches to generate filtered ROI patches according to a human's visual perception.

According to one of the exemplary embodiments, the image processing device includes a memory circuit and a processing circuit. The processing circuit is configured to receive an original image of a display, segment the original image into ROI patches, filter out a predetermined range of spatial frequency components from the ROI patches to generate filtered ROI patches, and identify a mura defect from the display according to the filtered ROI patches and the predetermined mura patterns.

In order to make the aforementioned features and advantages of the disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
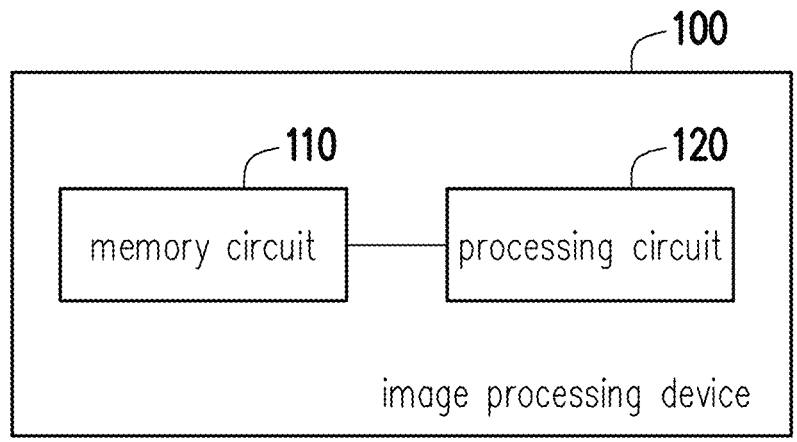
FIG. 1 illustrates a schematic diagram of a proposed image processing device in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed image processing device in accordance with one of the exemplary embodiments of the disclosure. All components of the image processing device and their configurations are first introduced in FIG. 1. The functionalities of the components are disclosed in more detail in conjunction with FIG. 2.

Referring to FIG. 1, an image processing device 100 for mura detection on a display would include a memory circuit 110 and a processing circuit 120 coupled thereto in the present exemplary embodiment. The image processing device 100 may be implemented as an integrated circuit (IC) or a computer system. The memory circuit 110 would be configured to store programming codes, device configurations, data, and so forth and may be implemented using any memory technology. The processing circuit 120 would be configured to implement functional elements of the proposed method in the following exemplary embodiments.

Figure 2:
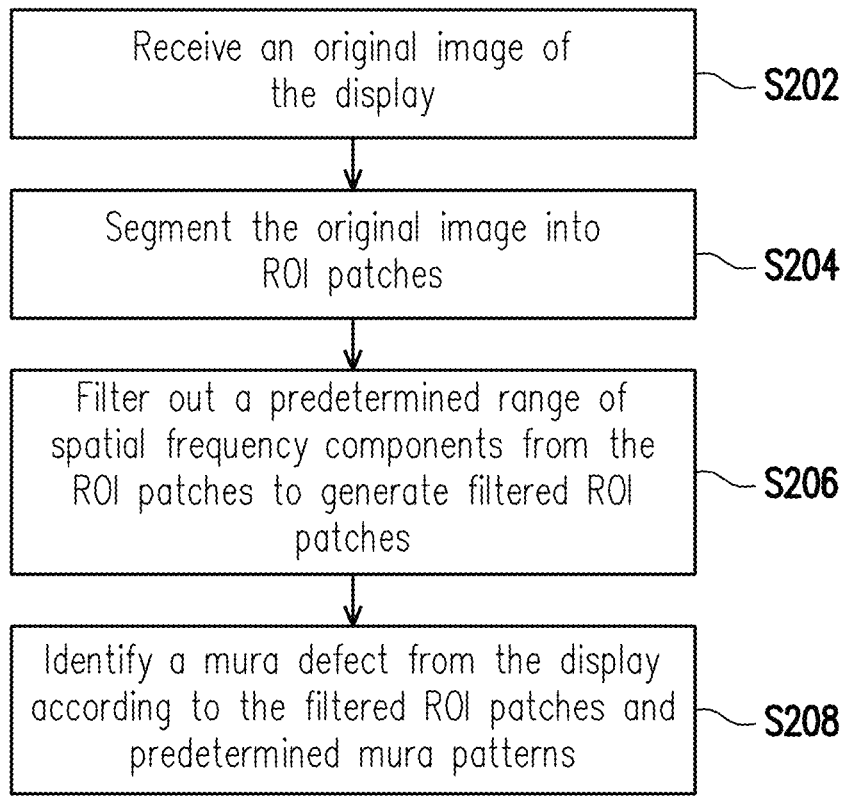
FIG. 2 illustrates a flowchart of a proposed method for mura detection on a display in accordance with one of the exemplary embodiments of the disclosure.

FIG. 2 illustrates a flowchart of a proposed method for mura detection on a display in accordance with one of the exemplary embodiments of the disclosure. The steps of FIG.

2 could be implemented by the proposed image processing device 100 as illustrated in FIG. 1. For illustrative purposes, the display would be an OLED display, and yet the disclosure is not limited in this regard.

Referring to FIG. 2 in conjunction to FIG. 1, the processing circuit 120 of the image processing device 100 would receive an original image of the display (Step S202). Herein, a test signal (e.g. a white signal, a black signal, a grey signal) may be generated and drive a panel of the display to display images. Then, an image of the panel would be photographed by an image capturing device such as a digital camera, a digital camcorder, a digital single lens reflex camera or other devices provided with an image capturing feature such as a smart phone, a tablet computer, a personal digital assistant, and so forth. In one exemplary embodiment, the processing circuit 120 may receive and set the photographed image as the aforesaid original image. In another exemplary embodiment, the processing circuit 120 may preprocess the photographed image to include only a region of interest by removing irrelevant background objects and set the preprocessed image as the aforesaid original image.

Next, the processing circuit 120 would segment the original image into ROI patches (Step S204) and filter out a predetermined range of spatial frequency components from the ROI patches to generate filtered ROI patches (Step S206). In one exemplary embodiment, a segmentation may be performed on the original image in a sliding window manner (i.e. patch-by-patch scanning) to generate an equal size of ROI patches (e.g. 101×101 pixels). In another exemplary embodiment, another segmentation may be further performed on the original image in a sliding window manner to generate another equal size of ROI patches (e.g. 301×301 pixels). More segmentations correspond to different equal sizes of ROI patches may be further performed based on actual needs. Herein, the predetermined range of the spatial frequency components may be associated with human visual perceptions or include less influential, irrelevant or unnecessary information.

The processing circuit 120 would identify a mura defect from the display according to the filtered ROI patches and predetermined mura patterns (Step S208). Herein, the predetermined mura patterns are various possible patterns that may describe mura patterns appearing on the display and may be prestored in the memory circuit 110. The filtered ROI patches with mara patterns may be identified through image comparison, and the corresponding mura defects would then be located from the display. Consequently, various available approaches can then be adopted on the identification result of mura defect to reduce the negative effect of the mura defect on image qualities.

Figure 3:
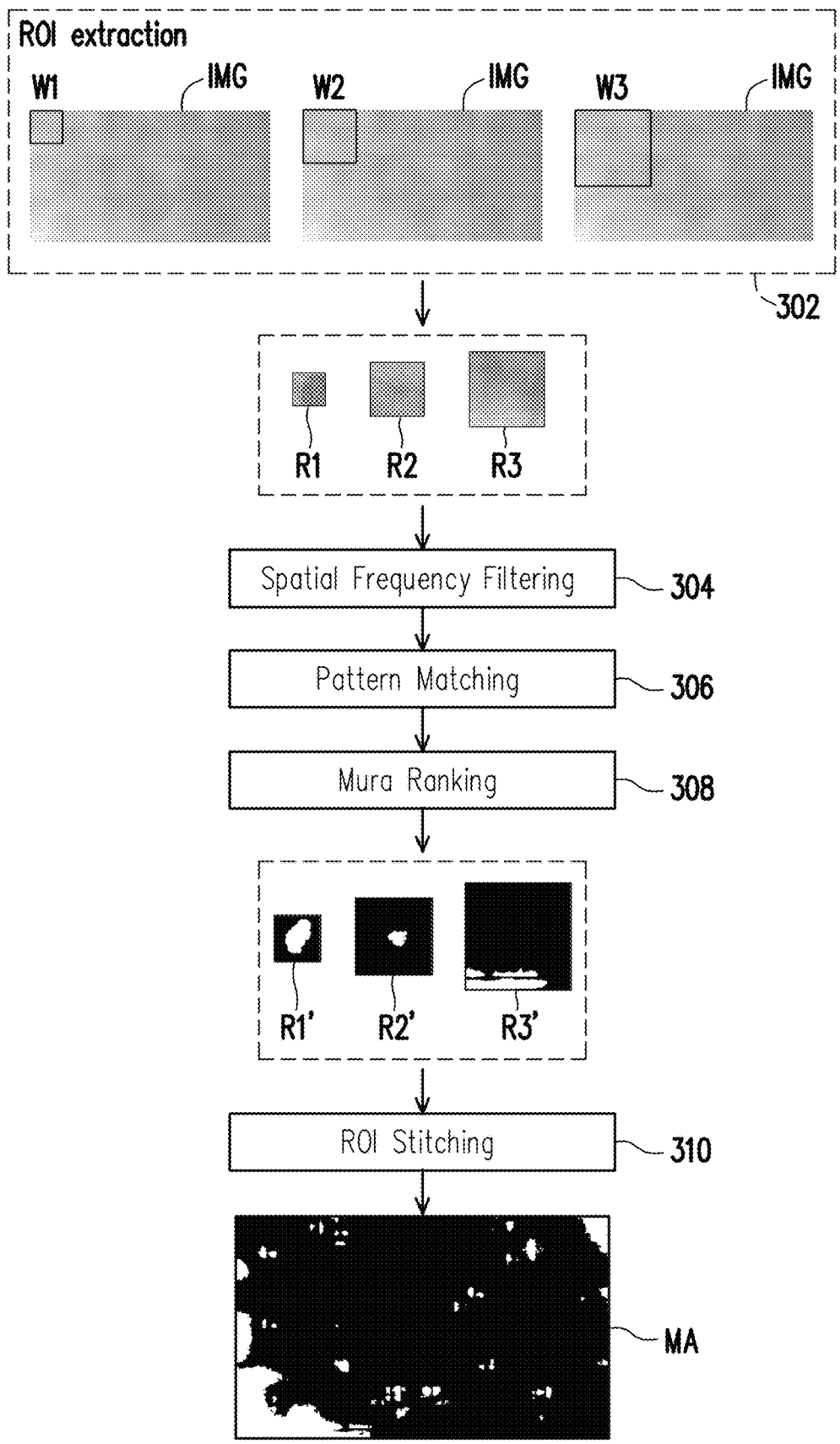
FIG. 3 illustrates a functional diagram of a proposed method for mura detection on a display in accordance with one of the exemplary embodiments of the disclosure.

For better comprehension, FIG. 3 illustrates a functional diagram of a proposed method for mura detection on a display in accordance with one of the exemplary embodiments of the disclosure.

Referring to FIG. 3 in conjunction to FIG. 1, once receiving an original image IMG, the processing circuit 120 would perform ROI extraction 302 thereon. In the present embodiment, the original image IMG would be segmented three different times to respectively produce three sizes W1-W3 of ROI patches. For example, R1, R2, and R3 are ROI patches respectively corresponding to different sizes of segmentations. Herein, each of the sizes W1-W3 would be associated with a different view angle of the user. Note that an average brightness of the display perceived by the user is highly dependent upon his/her field of view, thereby affecting the determination on any mura defect. Therefore, in the present exemplary embodiment, different sizes of segmentations would be used to imitate human perception when viewing a display with a different viewing angle.

Figure 4A:
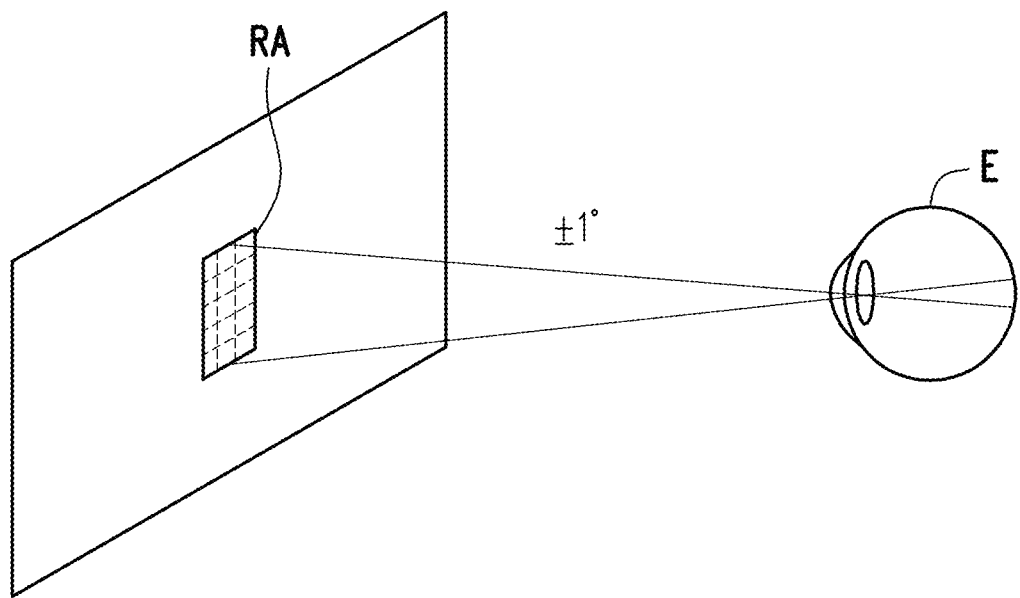
FIGS. 4A-4C illustrate three different viewing angles respectively associated with three different sizes of ROI in accordance with an exemplary embodiment of the disclosure.
Figure 4B:
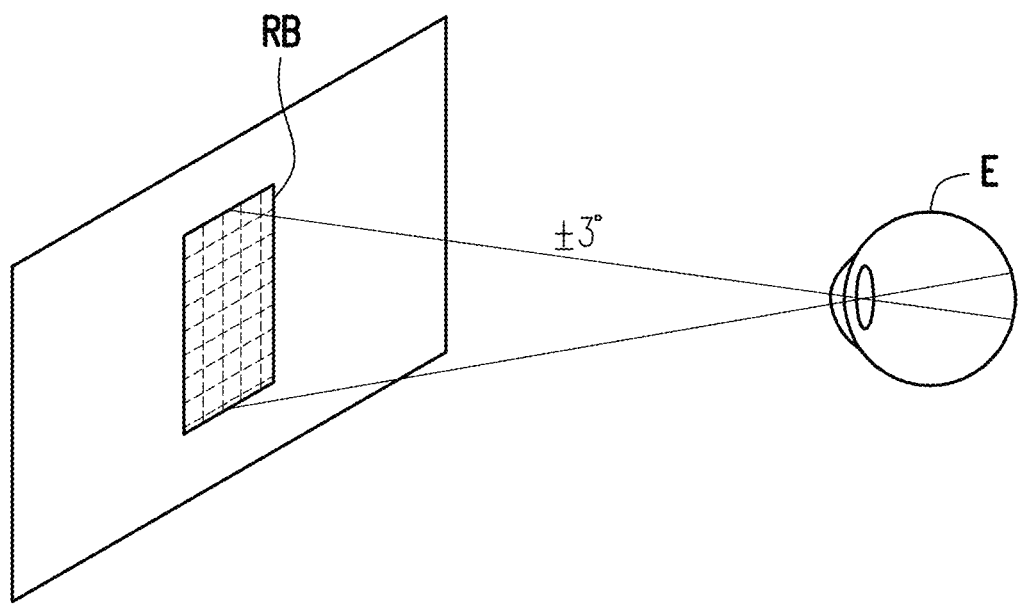
Figure 4C:
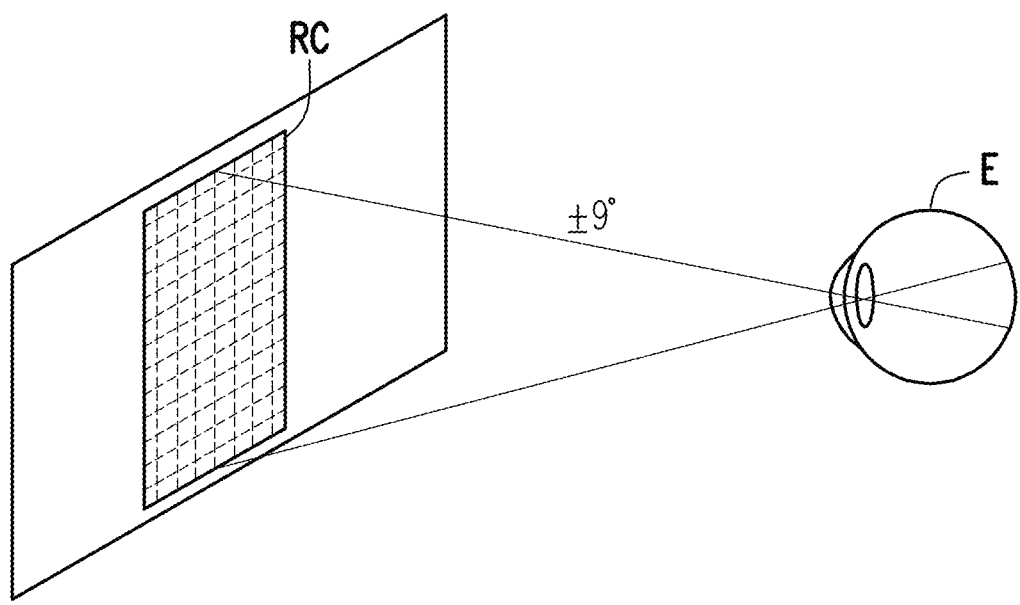

For example, FIGS. 4A-4C illustrate three different viewing angles respectively associated with three different sizes of ROI in accordance with an exemplary embodiment of the disclosure. When the viewing angle is ±1° as illustrated in FIG. 4A, a viewer E may concentrate on a relatively smaller region on the display 120, therefore a ROI patch with the size W1 may use to describe a smaller-sized concentrated region RA. When the viewing angle is ±3° as illustrated in FIG. 4B, a ROI patch with the size W2 may use to describe an intermediate-sized concentrated region RB. When the viewing angle is ±9° as illustrated in FIG. 4C, a ROI patch with the size W3 may use to describe a larger-sized concentration region RC.

Referring back to FIG. 3, once all the ROI patches are extracted, the processing circuit 120 would perform spatial frequency filtering 304 on the ROI patches to generate filtered ROI patches. Since a human visual system uses spatial frequency channels to perceive objects, the ROI patches would be transformed from a spatial domain into a spatial frequency domain to generate transformed ROI patches. Note that high spatial frequencies correspond to features such as sharp edges and fine details, whereas low spatial frequencies correspond to features such as global shape. It has been shown that only certain range of spatial frequency response would be visible by human. Such range may be described by a contrast sensitivity function (CSF). The CSF relates the visibility of a spatial pattern to both brightness contrast and spatial frequency and may be represented as Eq. (1):

$$C(f)=2.6(0.0192+0.114f)e^{-(0.114f)^{1.1}}$$

where f denotes the spatial frequency in cycles/degree. Therefore, the predetermined range of spatial frequency components including a range corresponding to a human's low visual perception would be filtered out from the transformed ROI patches according to the CSF to generate filtered-transformed ROI patches. The filtered-transformed ROI patches would be inverse-transformed from the spatial frequency domain back to the spatial domain to generate the filtered ROI patches. In other words, unperceivable mura patterns would be filtered out in this stage.

Next, the processing circuit 120 would perform pattern patching 306 on the filtered ROI patches. For illustrative purposes, only one of the filtered ROI patches (referred to as "a current filtered ROI patch") would be explained in details, and other filtered ROI patches would be performed in a same fashion.

Figure 5:
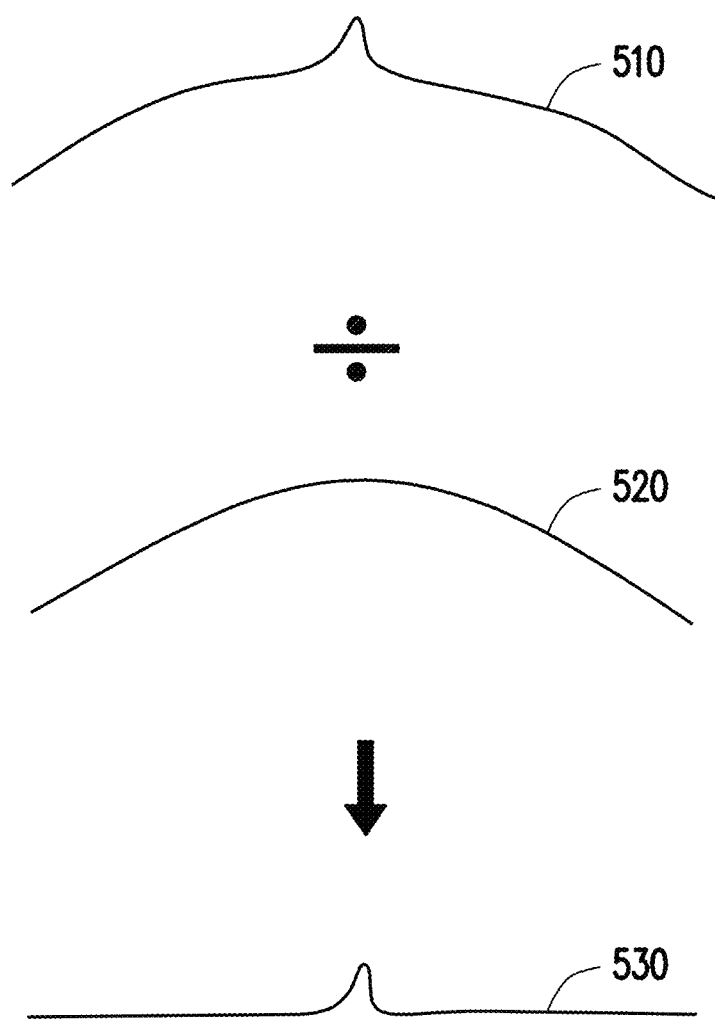
FIG. 5 illustrate a filtered ROI signal, a background signal, and a contrast signal in accordance with an exemplary embodiment of the disclosure.

Herein, background estimation for background removal purposes would be first performed on the current filtered ROI patch to generate a background ROI patch by leveraging, for example, a low-pass filtering approach. A contrast ROI patch corresponding to the current filtered ROI patch would be computed according to the filtered ROI patch and the background patch. The contrast ROI patch may be obtained by evaluating a division of the current filtered ROI patch and the background ROI patch as illustrated in FIG. 5 in accordance with an exemplary embodiment of the disclosure, where a contrast signal 530 may be given by a filtered ROI signal 510 divided by a background signal 520.

Once the contrast ROI patch is obtained, a matched mura pattern with a highest similarity among all predetermined mura patterns prestored in the memory circuit 110 would be determined to obtain the corresponding visibility threshold (i.e. the aforesaid matched visibility threshold of the filtered ROI patch). Herein, the predetermined mura patterns may be Gabor patches which are sinusoidal gratings patterns frequently used as stimuli in psychological experiments, and each of the predetermined mura patterns corresponds to a visibility threshold. Similarity comparison would be performed on the contrast ROI patch and the predetermined mura patterns. A matched visibility threshold of the contrast ROI patch corresponding to the current filtered ROI patch would then be determined among the visibility thresholds corresponding to the predetermined patterns. Once the matched visibility thresholds of all the filtered ROI patches are collected, the mura defect could be identified from the display accordingly.

Referring back to FIG. 3, the processing circuit 120 would perform mura ranking 308 according to the contrast ROI patches and the visibility thresholds corresponding to all the filtered ROI patches. In details, in the present exemplary embodiments, three mura images respectively corresponding to three different sizes of segmentations W1, W2, and W3 would be produced in this stage. Herein, each of the mura images would include mura levels of the filtered ROI patches of the corresponding size. Each of the mura levels corresponds to a different just noticeable different (JND) threshold, which is the minimum amount by which stimulus intensity would be changed in order to produce a noticeable variation in vision. From another perspective, a mura level may be considered as a scaled pixel value of each pixel in a mura image.

Figure 6:
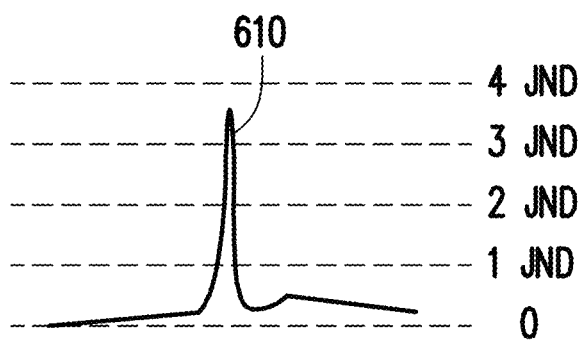
FIG. 6 illustrate a region of a mura image in accordance with an exemplary embodiment of the disclosure.
Figure 6:
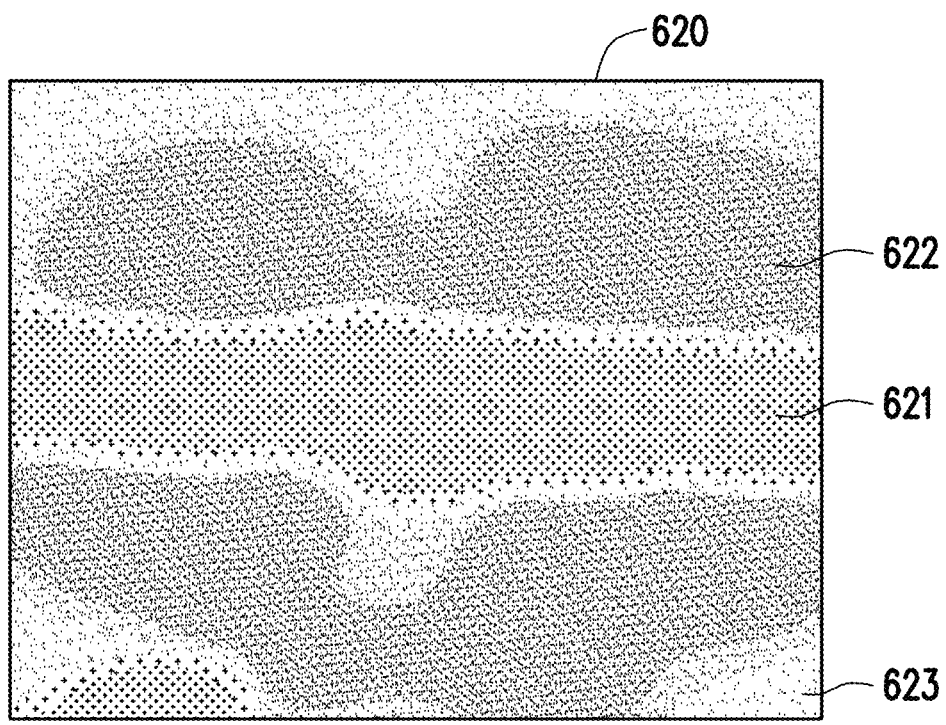

As illustrated in FIG. 6, a region 620 of a mura image corresponding to a contrast signal 610 in accordance with an exemplary embodiment of the disclosure would include different mura levels. For illustrative purposes, suppose that the mura levels include a first mura level taking a positive value and a second mura level taking a negative value. Herein, a brightness of a first pixel corresponding to the first mura level is greater than an average brightness of a region of the display corresponding to the region 620, whereas a brightness of a second pixel corresponding to the second mura level is less than the average brightness of the region of the display corresponding to the region 620. Note that a larger magnitude of a mura level corresponds to a larger severity of the mura defect. For example, suppose that mura levels of pixels 621, 622, and 623 in the region 620 are respectively −4, +4, and +1. That is, the pixels 621 and 622 would correspond to larger severities than the pixel 623, where the pixel 621 is larger than the average brightness corresponding to the region 620, and the pixel 622 is less than the average brightness corresponding to the region 620.

Referring back to FIG. 3, R1', R2' and R3' are three patches respectively from the three produced mura images for exemplary purposes. Taken all of the viewing angles into consideration, the processing circuit 120 would perform ROI stitching 310 on all the patches to the three mura images and compute a weighted sum thereof to obtain a weighted mura image MA and would identify the mura defect from the display according to the weighted mura image MA. Such weighted sum may be an average of the mura levels of the three mura images. It should be noted that, if the size of an ROI patch is equal to the size of the original image IMG, then ROI stitching 310 would not be performed. That is, the only produced mura image would be the image for mura defect identification.

In view of the aforementioned descriptions, the nature of irregularity of the mura as well as human vision perception are both considered in the proposed method and image processing device for mura detection on a display. Moreover, since different severity levels of mura are able to be properly classified and labelled, the disclosure would not only provide consistent and efficient mura detection, but would also be advantageous for demura processes.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for mura detection on a display, comprising:
receiving an original image of the display;
segmenting the original image into a plurality of region of interest (ROI) patches;
filtering out a predetermined range of spatial frequency components from the ROI patches to generate a plurality of filtered ROI patches; and
identifying a mura defect from the display according to the filtered ROI patches and a plurality of predetermined mura patterns,
wherein each of the predetermined mura patterns corresponds to a visibility threshold, and the step of identifying the mura defect from the display according to the filtered ROI patches and the predetermined mura patterns comprises:
for each of the filtered ROI patches, determining one of the visibility thresholds corresponding to the predetermined mura patterns to be a matched visibility threshold of the filtered ROI patch by performing similarity comparison based on the filtered ROI patch and the predetermined mura patterns; and
identifying the mura defect from the display according to the filtered ROI patches and the matched visibility thresholds of all the filtered ROI patches.

2. The method according to claim 1, wherein the step of filtering out the predetermined range of the spatial frequency components from the ROI patches to generate the filtered ROI patches comprises:
transforming the ROI patches from a spatial domain into a spatial frequency domain to generate a plurality of transformed ROI patches;
filtering out the predetermined range of the spatial frequency components from the transformed ROI patches to generate a plurality of filtered-transformed ROI patches; and
inverse-transforming the filtered-transformed ROI patches from the spatial frequency domain to the spatial domain to generate the filtered ROI patches.

3. The method according to claim 1, wherein the step of filtering out the predetermined range of the spatial frequency components from the ROI patches comprises:

filtering out the predetermined range of the spatial frequency components from the ROI patches according to a contrast sensitivity function.

4. The method according to claim 3, wherein the contrast sensitivity function is associated with a human's visual perception.

5. The method according to claim 1, wherein the predetermined range of the spatial frequency components comprises a range corresponding to a human's low visual perception.

6. The method according to claim 1, wherein for each of the filtered ROI patches, the step of determining one of the visibility threshold to be the matched visibility threshold of the filtered ROI patch by performing similarity comparison based on the filtered ROI patch and the predetermined mura patterns comprises:

determining a contrast ROI patch corresponding to the filtered ROI patch; and
   determining a matched predetermined mura pattern with a highest similarity to the contrast ROI patch from the predetermined mura patterns to obtain the visibility threshold corresponding to the matched predetermined mura pattern as the matched visibility threshold of the filtered ROI patch.

7. The method according to claim 6, wherein for each of the filtered ROI patches, the step of determining the contrast ROI patch corresponding to the filtered ROI patch comprises:

performing background estimation on the filtered ROI patch to generate a background ROI patch; and
   computing the contrast ROI patch corresponding to the filtered ROI patch according to the filtered ROI patch and the background ROI patch.

8. The method according to claim 7, wherein for each of the filtered ROI patches, the step of performing background estimation on the filtered ROI patch to generate the background ROI patch comprises:

performing low-pass filtering on the filtered ROI patch to generate the background ROI patch.

9. The method according to claim 7, wherein for each of the filtered ROI patches, the step of computing the contrast ROI patch corresponding to the filtered ROI patch according to the filtered ROI patch and the background ROI patch comprises:

evaluating a division of the filtered ROI patch and the background ROI patch to obtain the contrast ROI patch.

10. The method according to claim 1, wherein the step of identifying the mura defect from the display according to the contrast ROI patches and the visibility thresholds of all the filtered ROI patches comprises:

for each of the filtered ROI patches, comparing the contrast ROI patches and the visibility threshold to obtain a mura image comprising a plurality of mura levels of the filtered ROI patch; and
    identifying the mura defect from the display according to the mura image.

11. The method according to claim 10, wherein each of the mura levels corresponds to a different just noticeable difference (JND) threshold.

12. The method according to claim 10, wherein the mura levels comprise a first mura level taking a positive value and a second mura level taking a negative value, wherein a brightness of a first pixel corresponding to the first mura level is greater than an average brightness of a region of the display corresponding to the filtered ROI patch, and wherein a brightness of a second pixel corresponding to the second mura level is less than the average brightness of the region of the display corresponding to the filtered ROI patch.

13. The method according to claim 10, wherein a larger magnitude of a first mura level among the mura levels corresponds to a larger severity of the mura defect.

14. The method according to claim 1, wherein the step of segmenting the original image into the ROI patches comprises:

segmenting the original image with a plurality of different sizes to respectively generate the ROI patches, wherein each of the sizes is associated with a different view angle.

15. The method according to claim 14, wherein each of the predetermined mura patterns corresponds to a visibility threshold, and the step of identifying the mura defect from the display according to the filtered ROI patches and the predetermined mura patterns comprises:

for each of the filtered ROI patches in each of the different sizes, determining one of the visibility thresholds corresponding to the predetermined mara patterns to be a matched visibility threshold of the filtered ROI patch by performing similarity comparison based on the filtered ROI patch and the predetermined mura patterns; and
    identifying the mura defect from the display according to the contrast ROI patches and the matched visibility thresholds of all the filtered ROI patches for all the sizes.

16. The method according to claim 15, the step of identifying the mura defect from the display according to the contrast ROI patches and the matched visibility thresholds of all the filtered ROI patches for all the sizes comprises:

for each of the different sizes:
       for each of the filtered ROI patches, comparing the contrast ROI patches and the matched visibility threshold to obtain a mura image comprising a plurality of mura levels of the filtered ROI patch; and
       computing a weighted sum of the mura images respectively corresponding to the different sizes to obtain a weighted mura image; and
    identifying the mura defect from the display according to the weighed mura image.

17. The method according to claim 1, wherein the display is an OLED display.

18. An image processing device comprising:

a memory circuit, configured to store a plurality of predetermined mura patterns;
    a processing circuit, configured to:
       receive an original image of a display;
       segment the original image into a plurality of region of interest (ROI) patches;
       filter out a predetermined range of spatial frequency components from the ROI patches to generate a plurality of filtered ROI patches; and
       identify a mura defect from the display according to the filtered ROI patches and the predetermined mura patterns,
    wherein each of the predetermined mura patterns corresponds to a visibility threshold, and the processing circuit is further configured to:
       for each of the filtered ROI patches, determine one of the visibility thresholds corresponding to the predetermined mura patterns to be a matched visibility threshold of the filtered ROI patch by performing similarity comparison based on the filtered ROI patch and the predetermined mura patterns; and identify the mura defect from the display according to the filtered ROI patches and the matched visibility thresholds of all the filtered ROI patches.

\* \* \* \* \*